(12) United States Patent
Pahk et al.

(10) Patent No.: US 11,351,632 B2
(45) Date of Patent: Jun. 7, 2022

(54) PARTICLE REMOVAL APPARATUS AND LASER CUTTING APPARATUS INCLUDING THE SAME

(71) Applicant: SAMSUNG DISPLAY CO., LTD., Yongin-si (KR)

(72) Inventors: Jaebum Pahk, Seoul (KR); Jeongho Yi, Suwon-si (KR); Dokyun Kwon, Seoul (KR); Kyongho Hong, Hwaseong-si (KR); Jihun Kang, Cheonan-si (KR); Cheollae Roh, Seongnam-si (KR); Gyoowan Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 790 days.

(21) Appl. No.: 16/191,575

(22) Filed: Nov. 15, 2018

(65) Prior Publication Data
US 2019/0247954 A1    Aug. 15, 2019

(30) Foreign Application Priority Data

Feb. 14, 2018    (KR) .......................... 10-2018-0018183

(51) Int. Cl.
*B23K 26/142*    (2014.01)
*B23K 26/14*    (2014.01)
(Continued)

(52) U.S. Cl.
CPC ........ *B23K 26/142* (2015.10); *B23K 26/1476* (2013.01); *B23K 26/16* (2013.01);
(Continued)

(58) Field of Classification Search
CPC .. B23K 26/14; B23K 26/142; B23K 26/1423; B23K 26/1435; B23K 26/1436;
(Continued)

(56) References Cited

U.S. PATENT DOCUMENTS

| 4,942,284 A | * | 7/1990 | Etcheparre | ......... | B23K 26/1476 |
| | | | | | 219/121.67 |
| 5,254,834 A | * | 10/1993 | Johnson | ................ | H01R 43/00 |
| | | | | | 219/121.72 |

(Continued)

FOREIGN PATENT DOCUMENTS

| DE | 102015118486 A1 | * | 5/2017 | ........... | B23K 26/127 |
| GB | 2342883 A | * | 4/2000 | ......... | B23K 26/1476 |

(Continued)

*Primary Examiner* — Ibrahime A Abraham
*Assistant Examiner* — Gyounghyun Bae
(74) *Attorney, Agent, or Firm* — Cantor Colburn LLP

(57) ABSTRACT

A particle removal device includes: a stage on which a target substrate is disposed; an inner case defining a first discharge opening through which the stage is exposed to an internal space of the inner case; an outer case including: a side wall portion surrounding the inner case, a protrusion portion protruded from the side wall portion toward the inner case, and a second discharge opening in fluid connection with the first discharge opening; a suction pump connected to the second discharge opening; an air injector in fluid connection with the internal space; and an intake opening in fluid connection with the first and second discharge openings. A width of the intake opening as a distance between the distal end of the inner case and the distal end of the protrusion portion is smaller than a width of the first discharge opening.

20 Claims, 5 Drawing Sheets

(51) Int. Cl.
*B23K 26/16* (2006.01)
*B23K 26/38* (2014.01)
*B23K 26/402* (2014.01)
*B23K 37/04* (2006.01)
*B23K 101/36* (2006.01)

(52) U.S. Cl.
CPC ............ *B23K 26/38* (2013.01); *B23K 26/402* (2013.01); *B23K 37/0408* (2013.01); *B23K 2101/36* (2018.08)

(58) Field of Classification Search
CPC ............ B23K 26/1437; B23K 26/1438; B23K 26/144; B23K 26/146; B23K 26/1462; B23K 26/1464; B23K 26/147; B23K 26/1476; B23K 26/1482; B23K 26/1488; B23K 26/1494; B23K 26/348; B23K 26/38; B23K 26/16; B23K 26/402; B23K 37/0408; B23K 2101/36; B23K 26/00; B23K 26/702; B23K 2203/54; B23K 2201/42; H01L 31/04; B08B 5/04
USPC ............... 219/121.84, 121.6–121.86
See application file for complete search history.

(56) References Cited

U.S. PATENT DOCUMENTS

| | | | | | |
|---|---|---|---|---|---|
| 6,236,446 | B1 * | 5/2001 | Izumi | ................... | B23K 26/364 |
| | | | | | 349/187 |
| 6,531,682 | B1 * | 3/2003 | Guttler | ................. | B23K 26/147 |
| | | | | | 219/121.84 |
| 7,863,542 | B2 * | 1/2011 | Murase | ................. | B23K 26/16 |
| | | | | | 219/121.68 |
| 9,276,212 | B2 * | 3/2016 | Park | ................... | H01L 51/0014 |
| 2008/0002137 | A1 * | 1/2008 | Kim | ....................... | G02F 1/1341 |
| | | | | | 349/187 |
| 2008/0210675 | A1 * | 9/2008 | Sasaki | ................... | B23K 26/16 |
| | | | | | 219/121.84 |
| 2009/0314753 | A1 * | 12/2009 | Kosmowski | ......... | B23K 26/147 |
| | | | | | 219/121.72 |
| 2010/0038862 | A1 * | 2/2010 | Young | ................. | F16J 15/3424 |
| | | | | | 277/399 |
| 2010/0236583 | A1 * | 9/2010 | Schneider | ................. | B07B 4/02 |
| | | | | | 134/34 |
| 2014/0134763 | A1 * | 5/2014 | Park | ................... | H01L 51/0014 |
| | | | | | 438/26 |
| 2017/0158550 | A1 * | 6/2017 | Genier | ................. | C03B 33/074 |
| 2018/0159086 | A1 * | 6/2018 | Cho | ................. | H01L 27/3234 |
| 2019/0201948 | A1 * | 7/2019 | Fu | ............................ | B08B 11/04 |
| 2020/0147633 | A1 * | 5/2020 | Doyle | ....................... | B08B 3/02 |

FOREIGN PATENT DOCUMENTS

| | | | | |
|---|---|---|---|---|
| JP | 09271979 A | * | 10/1997 | |
| JP | 09281296 A | * | 10/1997 | ........... B23K 26/126 |
| JP | 2001150177 A | * | 6/2001 | |
| JP | 201230249 A | | 2/2012 | |
| JP | WO-2013027398 | * | 2/2013 | |
| KR | 1020110062886 A | | 6/2011 | |
| KR | 1020130091849 A | | 8/2013 | |
| KR | 101485062 B1 | | 1/2015 | |
| KR | 101552562 B1 | | 9/2015 | |
| KR | 1020160038634 A | | 4/2016 | |
| KR | 1020160051470 A | | 5/2016 | |

* cited by examiner

PARTICLE REMOVAL APPARATUS AND LASER CUTTING APPARATUS INCLUDING THE SAME

This application claims priority to Korean Patent Application No. 10-2018-0018183, filed on Feb. 14, 2018, and all the benefits accruing therefrom under 35 U.S.C. § 119, the disclosure of which is incorporated by reference herein in its entirety.

BACKGROUND

1. Field

The invention relates generally to a particle removal device and a laser cutting apparatus including the same, and more specifically to a particle removal device and a laser cutting apparatus including the same, which are capable of preventing contamination with particles at an outside of particle removal device by effectively removing the particles.

2. Description of the Related Art

A display device includes a plurality of pixels which are provided in a display area including a black matrix or pixel definition layer. Such display devices include liquid crystal display devices, light-emitting element display devices, electrophoretic display devices, etc.

A display device is manufactured by cutting a mother panel on which display elements are formed and subsequently separated from the mother panel. However, in this case, a problem may arise in that contamination in the form of particles is generated during the cutting of the mother panel such as using a laser cutting apparatus. Thus, a display panel formed from the separated display elements and the internal parts of manufacturing equipment with which the display panel is formed are undesirably contaminated with the particles.

SUMMARY

The present disclosure is directed to a particle removal device and a laser cutting apparatus including the same, which are capable of effectively removing particles generated during the cutting of a mother panel.

According to an exemplary embodiment of the invention, there is provided a particle removal device including: a stage; an inner case disposed on the stage, defining a first discharge opening at a distal end of the inner case; an outer case including: a side wall portion disposed to surround an outer surface of the inner case, a protrusion portion protruded from the side wall portion toward the distal end of the inner case at which the first discharge opening is defined, and a second discharge opening defined in the side wall portion, in fluid connection with the first discharge opening of the inner case; a suction pump connected to the second discharge opening, with which a suction force is provided to the second discharge opening; an air injector in fluid connection with the internal space of the inner case, with which air is injected to the internal space of the inner case; and an intake opening in fluid connection with both the first and second discharge openings, defined between the distal end of the inner case and a distal end of the protrusion portion of the outer case which is closest to the stage. A width of the intake opening as a distance between the distal end of the inner case and the distal end of the protrusion portion is smaller than a width of the first discharge opening.

The protrusion portion of the outer case may be spaced apart from the stage by a distance of about 20 millimeters (mm) or less.

The inner case may include: a vertical portion including a lower end thereof disposed closest to the stage, the lower end of the vertical portion defining the distal end of the inner case at which the first discharge opening is defined; and an inclined portion extended from an upper end of the vertical portion which is opposite to the lower end thereof, inclined at a predetermined angle with respect to the vertical portion.

The distance between the inclined portion and the outer case may be larger than the width of the intake opening.

The intake opening may be defined between the distal end of the protrusion portion of the outer case and the lower end of the vertical portion which is closest to the stage.

The width of the intake opening as a distance between the distal end of the inner case defined by the lower end of the vertical portion and the distal end of the protrusion portion may be about 20 mm or less.

Along a thickness direction, the distal end of the protrusion portion may overlap the inclined portion and the vertical portion.

Along a thickness direction, the distal end of the protrusion portion may overlap the vertical portion.

Along a thickness direction, the distal end of the protrusion portion may overlap the inclined portion but may not overlap the vertical portion.

Along a thickness direction, the distal end of the protrusion portion may not overlap the vertical portion.

In a top plan view, the intake opening may have a closed curve shape.

The air injector may include a nozzle through which air is output from the air injector to the internal space of the inner case.

An air injection angle of the nozzle through which the air is output to the internal space of the inner case may be adjustable.

According to another exemplary embodiment of the invention, there is provided a laser cutting apparatus including: a stage on which a target substrate is disposed; and a particle removal device disposed apart from the stage, defining an internal space of the particle removal device to which the stage is exposed and through which a laser light from a laser irradiator travels to the target substrate disposed on the stage. The particle removal device defining the internal space to which the stage is exposed includes: an inner case disposed on the stage, defining a first discharge opening at a distal end of the inner case; an outer case including: a side wall portion disposed to surround an outer surface of the inner case, a protrusion portion protruded from the side wall portion toward the distal end of the inner case at which the first discharge opening is defined, and a second discharge opening defined in the side wall portion, in fluid connection with the first discharge opening of the inner case; a suction pump connected to the second discharge opening, with which a suction force is provided to the second discharge opening; an air injector in fluid connection with the internal space of the inner case, with which air is injected to the internal space of the inner case; and an intake opening in fluid connection with both the first and second discharge openings, defined between the distal end of the inner case and a distal end of the protrusion portion of the outer case which is closest to the stage. A width of the intake opening as a distance between the distal end of the inner case and the distal end of the protrusion portion is smaller than a width of the first opening.

The protrusion portion of the outer case may be spaced apart from the stage by a distance of about 20 mm or less.

The inner case may include: a vertical portion including a lower end thereof disposed closest to the stage, the lower end of the vertical portion defining the distal end of the inner case at which the first discharge opening is defined; and an inclined portion extended from an upper end of the vertical portion which is opposite to the lower end thereof, inclined at a predetermined angle with respect to the vertical portion.

The distance between the inclined portion and the outer case may be larger than the width of the intake opening.

The width of the intake opening may be defined as a distance between the distal end of the protrusion portion of the outer case and the lower end of the vertical portion which is closest to the stage.

The width of the intake opening may be about 20 mm or less.

In a top plan view, the intake opening may have a closed curve shape.

BRIEF DESCRIPTION OF THE DRAWINGS

A more complete appreciation of the invention will become more apparent by describing in detail exemplary embodiments thereof with reference to the accompanying drawings, wherein.

DETAILED DESCRIPTION

Figure 1:
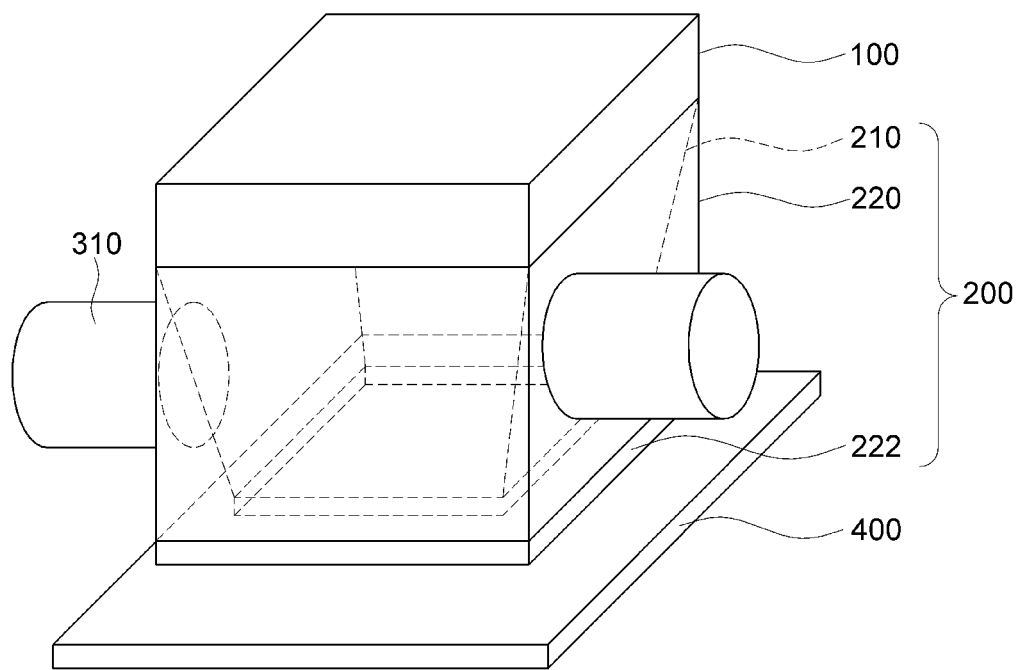
FIG. 1 is a schematic diagram of an exemplary embodiment of a particle removal device according to the invention.

The advantages and features of the invention and methods for achieving them will become apparent from exemplary embodiments described below in detail in conjunction with the accompanying drawings. However, the invention is not limited to the following exemplary embodiments, but may be implemented in various different forms. These exemplary embodiments are provided merely to make the disclosure of the present disclosure complete and to fully convey the scope of the invention to a person having ordinary knowledge in the art to which the invention pertains. The invention is defined only by the scope of the attached claims. Therefore, in some exemplary embodiments, well-known process steps, component structures, and technologies will not be described in detail in order to prevent the present disclosure from being obscurely interpreted. Throughout the specification, the same reference symbols refer to the same components.

Throughout the drawings, thicknesses are illustrated in an exaggerated manner in order to clearly describe a plurality of layers and areas. Like reference numbers are used to denote like elements throughout the specification.

When a portion, such as a layer, a film, an area, a plate, or the like, is described to as being related to another element such as being "on" another portion, this means not only a case where the former portion is disposed "immediately on" the latter portion with no third portion interposed therebetween but also a case where the former portion is disposed on the latter portion with a third portion interposed therebetween. In contrast, when a portion is described to as being related to another element such as being "directly on" or "immediately on" another portion, this means a case where a third portion is not present between a former and a latter portion. Furthermore, when a portion, such as a layer, a film, an area, a plate, or the like, is described to as being "beneath" another portion, this means not only a case where the former portion is disposed "immediately beneath" the latter portion with no third portion interposed therebetween but also a case where the former portion is disposed beneath the latter portion with a third portion interposed therebetween. In contrast, when a portion is described to as being related to another element such as being "directly beneath" or "immediately beneath" another portion, this means a case where a third portion is not present between a former and a latter portion.

Spatially relative terms, such as "below," "beneath," "lower," "above," "upper" and the like, may be used herein for ease of description to describe the relationship between one element or feature and another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Accordingly, the exemplary term "below" can encompass both the orientations of above and below. The device may be also oriented in another direction, and thus the spatially relative terms may be interpreted differently depending on the orientation.

Throughout the present specification, when any portion is described as being coupled to another portion, this includes not only a case where they are mechanically or physically connected to each other but also a case where they are electrically and/or fluidly connected to each other such as with an element interposed therebetween. Furthermore, when any portion is described as including any component, this is not intended to exclude another component but is intended to include another component, unless particularly described to the contrary.

Although the terms "first," "second," "third," etc. may be used herein to describe various components, these components should not be limited by these terms. These terms may be each used merely to distinguish one component from another component. For example, a first component may be termed a second or third element without departing from the teachings of the exemplary embodiments. In a similar manner, a second or third component may be termed interchangeably.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

One or more exemplary embodiment of a particle removal device and a laser cutting apparatus which includes the same according to the invention will be described in detail with reference to FIGS. 1 to 4.

Figure 2:
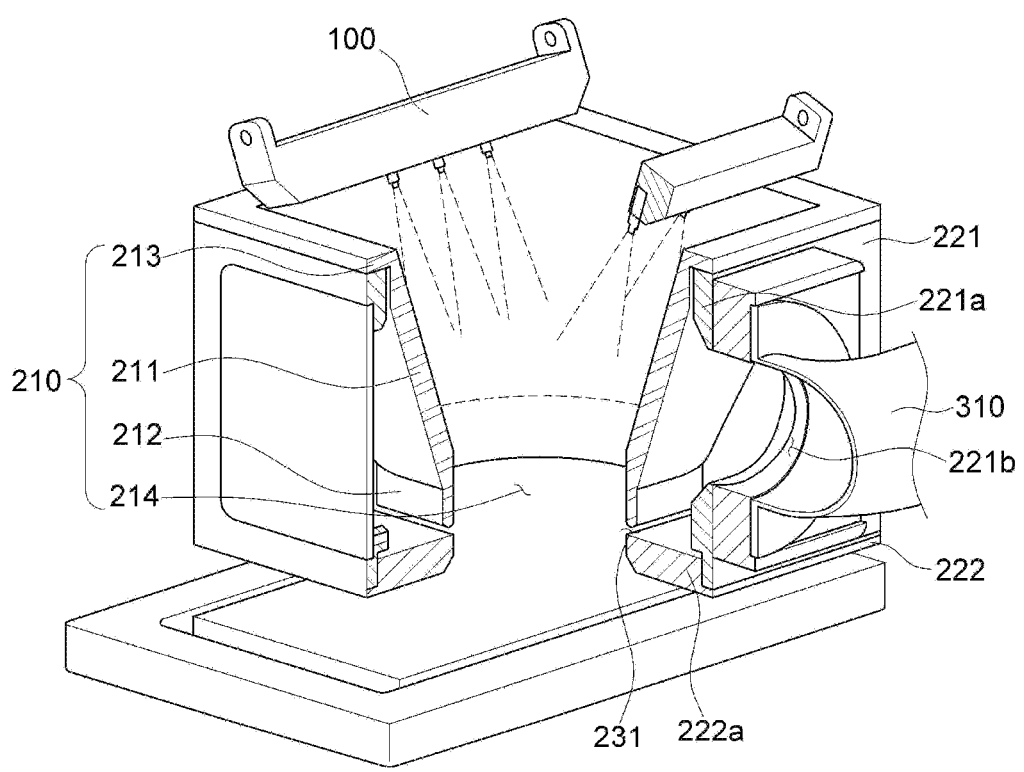
FIG. 2 is a perspective view of an exemplary embodiment of a partial cross-section of the particle removal device according to the invention.
Figure 3:
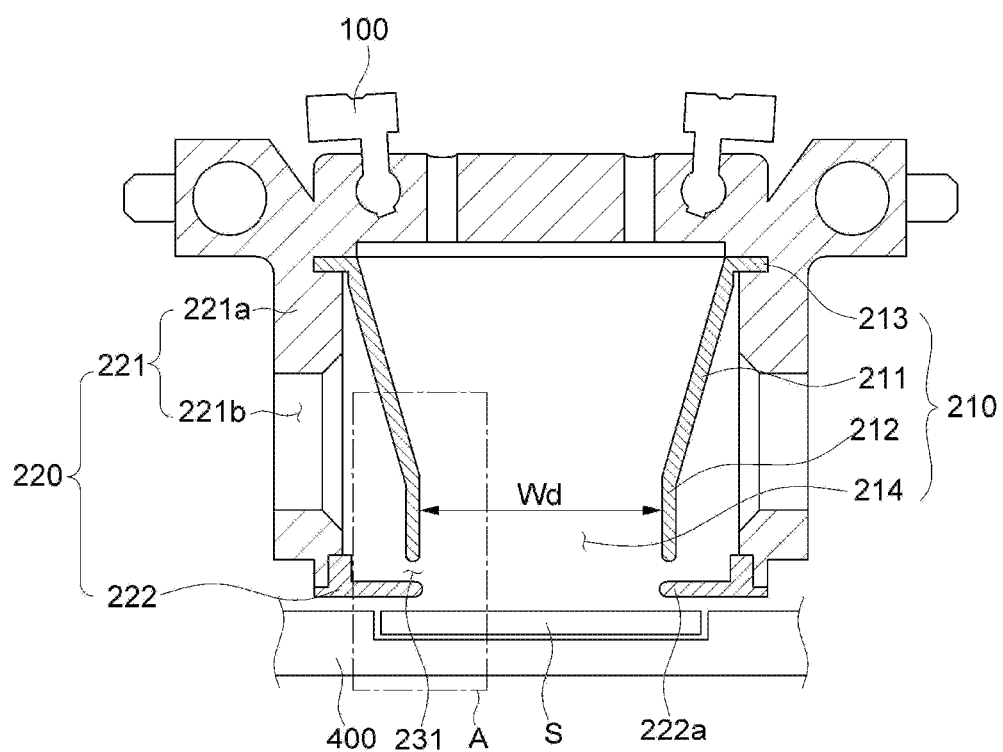
FIG. 3 is an exemplary embodiment of a cross-sectional view of the particle removal device according to the exemplary embodiment of the present disclosure.

FIG. 1 is a schematic diagram of an exemplary embodiment of a particle removal device according to the invention, FIG. 2 is a perspective view of an exemplary embodiment of a partial cross-section of the particle removal device according to the invention, and FIG. 3 is an exemplary embodiment of a cross-sectional view of the particle removal device according to the invention.

Referring to FIGS. 1 and 2, the particle removal device according to one or more exemplary embodiment includes an injection unit 100, a discharge unit 200, a suction unit (not shown), and a stage 400. The stage 400 may be a same stage which is used in a laser cutting apparatus to process a target substrate, without being limited thereto. The particle removal device and components thereof may be generally disposed in a plane defined by first and second directions crossing each other, where a thickness is defined a third direction crossing each of the first and second directions. In FIG. 3, a horizontal direction may represent the first and/or second directions, while a vertical direction represents the thickness direction.

The injection unit 100 is disposed on the discharge unit 200, along the thickness direction. The injection unit 100 injects air toward the discharge unit 200. The injection unit 100 may be a separate member from the discharge unit 200. The injection unit 100 may be attachable to and detachable from the discharge unit. However, the injection unit 100 is not limited thereto, but may be integrated with the discharge unit 200.

Although not shown in these drawings, the injection unit 100 may include an inlet, an outlet and a nozzle. Air is introduced from an air pump connected to the injection unit 100, into the injection unit 100 through the inlet thereof. The introduced air may move within or through the injection unit 100 such as within a body thereof, to the nozzle of the injection unit 100 and through the outlet thereof. The nozzle injects the air, supplied through the outlet to the nozzle, into an inner case 210 of the discharge unit 200. Air may exit from the injection unit 100 through the nozzle thereof.

In an exemplary embodiment, more specifically, the nozzle injects the air which has been supplied through the outlet, onto an inclined portion of the inner case 210 of the discharge unit 200. In this case, an angle adjustment unit configured to adjust an air injection angle of the nozzle may be further included in the particle removal device. The nozzle may be provided in plurality. In an exemplary embodiment, more specifically, the angle adjustment unit may adjust the injection angle of the plurality of nozzles simultaneously, or may adjust the injection angle of each nozzle independently. In an exemplary embodiment, for example, the angle adjustment unit may be a hinge configured to adjust the injection angles of a plurality of nozzles. The hinge may be connected to the plurality of nozzles. However, the exemplary embodiment of the present disclosure is not limited thereto, but one of various members may be used as an angle adjustment means.

The discharge unit 200 includes the inner case 210 and an outer case 220.

The inner case 210 is disposed inside the outer case 220. The outer case 220 may form outer surfaces of the particle removal device, without being limited thereto.

The inner case 210 includes an inclined portion 211, a vertical portion 212, a support portion 213, and a discharge opening 214. A portion of the inner case 210 may be extended outside the outer case 220, without being limited thereto The inclined portion 211 has a shape inclined at a predetermined angle in a direction toward the inside of the outer case 220, such as relative to a plane parallel to that in which the stage 400 is disposed. Accordingly, the upper portion of the inner case 210 has a larger width in cross-section than the lower portion thereof.

According to the present exemplary embodiment of the present disclosure, the inclined portion 211 may be spaced apart from the outer case 220 by a distance larger than the width of an intake opening 231 to be described later.

The vertical portion 212 of the inner case 210 is spaced apart from the outer case 220, and extends vertically from the bottom of the inclined portion 211 toward a lower plate 222 of the outer case 220 to be described later. The vertical portion 212 is spaced apart from a protrusion portion 222a of the lower plate 222.

Although not shown in these drawings, the vertical portion 212 may be disposed in a planar shape corresponding to a planar shape defined by a cutting line of a substrate along which the substrate undergoes laser beam machining on a plane. In an exemplary embodiment, for example, when the cutting line of the processing target substrate has a rectangular shape in the top plan view, the vertical portion 212 may be disposed to define a space having a rectangular shape in the top plan view.

The support portion 213 of the inner case 210 extends from the upper portion of the inclined portion 211 such as in a horizontal direction. The support portion 213 of the inner case 210 is disposed on or extends into the support portion 221a of the outer case 220 to be described later. The injection unit 100 is disposed on the support portion 213 of the inner case 210.

The discharge opening 214 is an internal space defined in the inner case 210 at the vertical portion 212, and forms a flow path for particles and the air injected from the injection unit 100. The discharge opening 214 may have a shape corresponding to the cutting line of a processing target substrate S along which the processing target substrate S is cut such as by laser beam machining. More specifically, since the vertical portion 212 is disposed to correspond to the cutting line of the processing target substrate S in the top plan view, the discharge opening 214 defined by the vertical portion 212 may have substantially the same planar shape as the cutting line of the processing target substrate S. Accordingly, removal of particles generated during cutting of the processing target substrate S without moving the particle removal device may be possible according to one or more exemplary embodiment of the invention, thereby reducing or effectively preventing particles from leaking to outside the particle removal device. Furthermore, a width Wd of the discharge opening 214 may be proportional to a dimension of the cutting line along which the processing target substrate S is cut.

The outer case 220 includes a side wall portion 221 and the lower plate 222.

The side wall portion 221 is disposed to surround the inner case 210. A portion of the side wall portion 221 is spaced apart from the inner case 210 and forms a flow path for air.

As shown in FIG. 3, the side wall portion 221 includes a support portion 221a and a discharge opening 221b. The side wall portion 221 of the outer case 220 may be disposed at one or more sides of the particle removal device, such as being disposed at all four sides of the particle removal device.

The support portion 221a of the outer case 220 supports thereon the injection unit 100 and the inner case 210. More specifically, the support portion 213 of the inner case 210 and the injection unit 100 are located on the support portion 221a of the outer case 220. In this case, the support portion 221a of the outer case 220 is coupled to the support portion 213 of the inner case 210 and the injection unit 110 by fastening members, such as screws.

The discharge opening 221b is defined by the support portion 221a. The discharge opening 221b is located or defined in at least one side wall portion 221 of the outer case 220. The discharge opening 221b is connected to a suction pump (not shown) through the discharge conduit 310. The suction pump may be discharged outside the particle removal device and connected thereto. The discharge opening 221b forms a flow path from an inner area of the particle removal device to an outside thereof, for particles and air. The discharge opening 221b and the discharge conduit 310 may together form a flow path of the particle removal device from an inner area thereof to outside thereof.

The lower plate 222 supports the side wall portion 221. In other words, the side wall portion 221 is located on the lower plate 222 along the thickness direction of the particle removal device.

The lower plate 222 includes the protrusion portion 222a.

The protrusion portion 222a protrudes from the side wall portion 221 into the outer case 220. That is, the protrusion portion 222a protrudes towards the inner case at an inner area of the outer case 220. Accordingly, the lower plate 222 defines a space in conjunction with the inner case 210, though which particles and air can be discharged to the discharge opening 221b and away from the target substrate S. More specifically, the protrusion portion 222a of the lower plate 222 defines the intake opening 231 in conjunction with the vertical portion 212 of the inner case 210. In an exemplary embodiment, for example, a distal end of the protrusion portion 222a which is closest to the inner case 210 defines the intake opening 231 in conjunction with a distal end of the inner case 210 at the lower portion thereof. In this case, according to the present exemplary embodiment of the present disclosure, the protrusion portion 222a may overlap the vertical portion 212 of the inner case 210. More specifically, the end portion of the protrusion portion 222a may be disposed in substantially a same plane as the distal end of the vertical portion 212 to overlap the distal end at the lower portion of the vertical portion 212, or the end portion of the protrusion portion 222a may be disposed overlapping the distal end at the lower portion of the vertical portion 212 along the thickness direction (e.g., in the top plan view).

Although not shown in these drawings, the intake opening 231 may have a planar shape corresponding to that of the vertical portion 212.

The intake opening 231 may have a width Wi of about 20 millimeters (mm) or less, as measured between end portions of the protrusion portion 222a and the vertical portion 212 overlapping each other. In this case, when the intake opening 231 has a width larger than about 20 mm, the flow speed of particles and air is relatively low, and thus particles may leak to the outside the discharge portion 200 and/or toward the target substrate S. In an exemplary embodiment, for example, the intake opening 231 may have a width Wi equal to or larger than about 5 mm and equal to or smaller than about 10 mm.

The intake opening 231 has a width Wi smaller than the inner width Wd of the discharge opening 214 defined by the vertical portion 212 of the inner case 210.

The protrusion portion 222a reduces or effectively prevents air, moving from an inner area the inner case 210 to an inner area of the outer case 220, from leaking to the outside the discharge portion 200 and toward the target substrate S instead of toward the discharge opening 221b. More specifically, the protrusion portion 222a forms a flow path for air, directed to the discharge opening 221b, in fluid connection with the inner areas of each of the inner case 210 and the outer case 220, thereby reducing or effectively preventing air, moving from the inner area of the inner case 210 to the inner area of the outer case 220 toward the target substrate S or toward the outside of the discharge unit 200.

The lower plate 222 is integrated with the side wall portion 221. More specifically, the protrusion portion 222a may be integrated with the side wall portion 221, such as to be not detachably coupled thereto. Alternatively, the lower plate 222 may be detachably coupled to the side wall portion 221 by a separate fastening member, such as a screw.

As shown in FIGS. 1 and 2, the suction unit may include a discharge conduit 310 and a suction pump (not shown) which is connected to the discharge conduit 310.

The discharge conduit 310 connects an inner area of the outer case 220 and the suction pump to each other, and forms a flow path for particles and air directed from the discharge opening 221b of the outer case 220 to the suction pump.

The suction pump provides power and force used to draw air and particles at inner areas of the inner case 210 and the outer case 220 to outside thereof, respectively. Accordingly, the suction pump forms a flow path for particles and air directed from the discharge opening 214 of the inner case 210, to the discharge opening 221b of the outer case 220, through the intake opening 231 disposed in the flow path therebetween.

The stage 400 provides a space in which the processing target substrate S undergoes processing such as by laser beam machining. The stage 400 may be spaced apart from the discharge unit 200. More particularly, the stage 400 may be spaced apart from the protrusion portion 222a of the lower plate 222.

Figure 4:
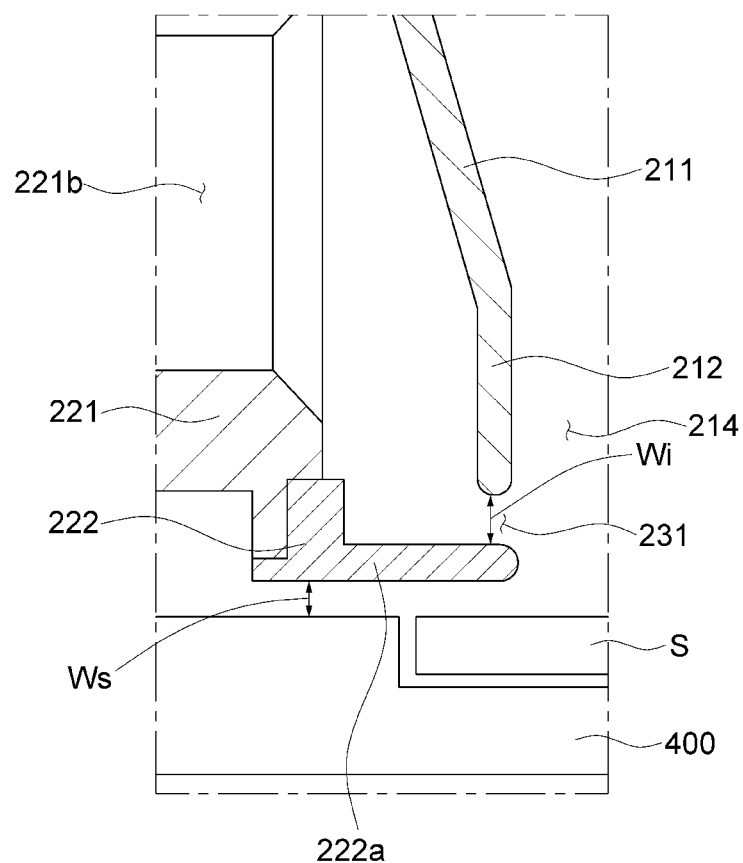
FIG. 4 is an enlarged view of an exemplary embodiment of portion "A" of FIG. 3.

FIG. 4 is an exemplary embodiment of an enlarged view of portion "A" of FIG. 3.

According to the present exemplary embodiment of the present disclosure, the stage 400 may be spaced apart from the protrusion portion 222a of the lower plate 222 by an interval Ws along the thickness direction by about 20 mm or less. When the stage 400 is spaced apart from the lower plate 222 along the thickness direction by a distance larger than 20 mm, particles generated from the processing of the target substrate S may leak from the particle removal device to the outside thereof toward the stage 400 and/or the target substrate S. In an exemplary embodiment, for example, the stage 400 may be spaced apart from the protrusion portion 222a of the lower plate 222 by an interval Ws equal to or larger than about 3 mm and equal to or smaller than about 10 mm.

A process of removing particles by means of the particle removal device according to one or more exemplary embodiment of the present disclosure will be described in detail with reference to FIGS. 3 and 4.

Referring to FIG. 3, the target substrate S disposed on the stage 400 is processed such as by being machined by laser light emitted from a laser radiation unit (not shown). More specifically, referring to FIG. 3, the laser light emitted from the laser radiation unit passes through the particle removal device and toward the stage 400, and machines the target substrate S disposed on the stage 400 at the lower portion of the particle removal device. In this case, particles are generated from the target substrate S which is being machined. Such particles may be considered contaminants to the processed target substrate S.

The injection unit 100 injects air toward the lower portion of the inner case 210 at which the target substrate S is disposed, thereby reducing or effectively preventing movement and leaking of the particles generated from the processing target substrate S in a direction toward the upper portion of the inner case 210 (e.g., back toward the injection unit 100). The air injected by the injection unit 100 is moved along the inclined portion 211 of the inner case 210, from an upper portion thereof toward a lower portion thereof along the thickness direction of the particle removal device.

The air moved along the inclined portion 211 of the inner case 210 is moved to the discharge opening 214 by air pressure provided from the injection unit 100.

The air having passed through the discharge opening 214 is moved toward the intake opening 231, such as along the first and/or second directions (e.g., horizontal in FIGS. 3 and 4). That is, the air having passed through the discharge opening 214 moves away from the discharge opening 214 and the target substrate S disposed at the discharge opening 214. In this case, the intake opening 231 has a width Wi between the inner and outer cases 210 and 220 smaller than the width Wd of the discharge opening 214, and thus a flow path for air and particles is formed from the discharge opening 214, through the intake opening 231 between the inner and outer cases 210 and 220.

The intake opening 231 has a width Wi smaller than the width Wd of the discharge opening 214, and thus has a sectional area smaller than that of the discharge opening 214. In this case, according to Bernoulli's principle stating that the speed of fluid is inversely proportional to the sectional area through which the fluid passes, the speed of air in the intake opening 231 is relatively higher than the speed of air in the discharge opening 214. In other words, the speed of air having passed through the discharge opening 214 increases at the intake opening 231. Accordingly, the particles generated from the processed target substrate S in the air, together with the air the speed of which has increased in a direction away from the target substrate S, move through the intake opening 231 at a relatively high speed.

According to one or more exemplary embodiment of the present disclosure, the intake opening 231 may have a width Wi of about 20 mm or less.

The particles and the air in which the particles are disposed moved through the intake opening 231 may be moved toward the discharge opening 221b through a space formed between an outer (wall) surface of the inner case 210 and an inner (wall) surface of the outer case 220. In this case, the distance between the inclined portion 211 of the inner case 210 and the outer case 220 may be larger than that of the intake opening 231 between the vertical portion 212 and the outer case 220. Accordingly, the sectional area of the intake opening 231 is the smallest among those of the flow paths for particles and air, and thus air may move at the highest speed at the intake opening 231.

Furthermore, a suction force formed by the suction pump forms an air flow path directed into the outer case 220 at a space between the processing target substrate S and the outer case 220. Accordingly, leaking of particles out of the outer case 220 and toward the target substrate S through a space between the target substrate S and the outer case 220 is reduced or effectively prevented.

According to one or more exemplary embodiment of the present disclosure, particles or contamination generated during the processing of the target substrate S such as by cutting thereof, may be effectively removed without leakage to the outside of the particle removal device and particularly toward the processed target substrate S. Accordingly, contamination with particles from processing a target substrate S, of a display panel formed from a separated portion of the processed target substrate S and internal parts of manufacturing equipment at and/or disposed relative to the particle removal device may be reduced or effectively prevented.

The particles and the air having passed through the intake opening 231 are discharged from the particle removal device through the discharge opening 221b and the discharge conduit 310 at the sidewall portion 221.

Figure 5:
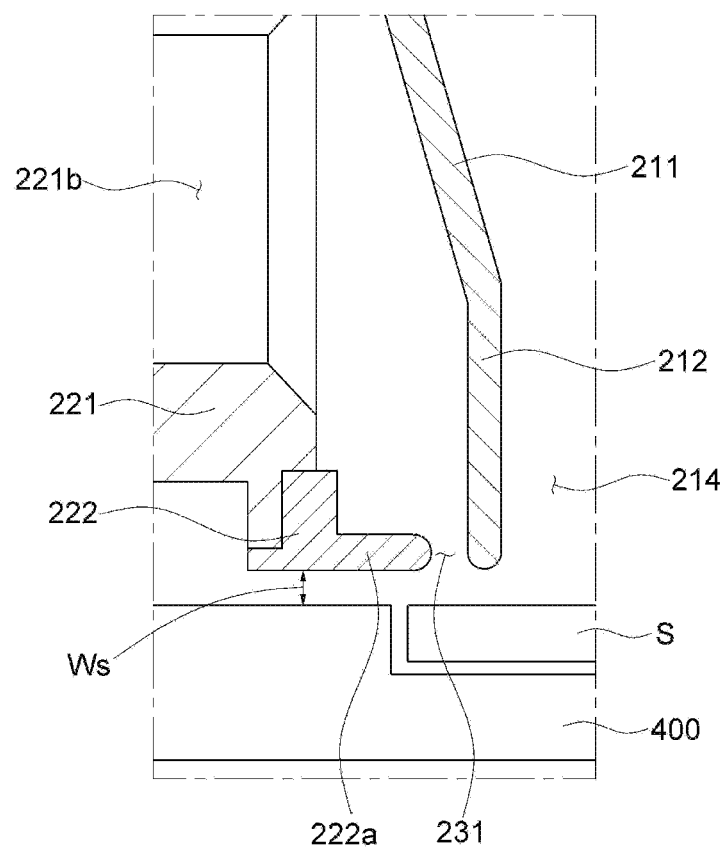
FIG. 5 is another enlarged view another exemplary embodiment of portion "A" of FIG. 3.

FIG. 5 is another exemplary embodiment of an enlarged view of portion "A" of FIG. 3. Another exemplary embodiment of a particle removal device and a laser cutting apparatus including the same will be described in detail below.

In the following, redundant descriptions will be omitted for the brevity of description.

An outer case 220 includes a side wall portion 221 and a lower plate 222.

The side wall portion 221 is disposed to be spaced apart from and to surround an inner case 210.

The lower plate 222 includes a protrusion portion 222a.

The protrusion portion 222a protrudes from the side wall portion 221 into the outer case 220, e.g., toward the inner case 210. Accordingly, the lower plate 222 defines a space, through which particles and air can be discharged, in conjunction with the inner case 210. More specifically, the protrusion portion 222a of the lower plate 222 defines an intake opening 231 in conjunction with the vertical portion 212 of the inner case 210. In an exemplary embodiment, for example, a distal end of the protrusion portion 222a defines the intake opening 231 in conjunction with a distal end of the lower portion of the vertical portion 212. In this case, according to the structure detailed in FIG. 5, the protrusion portion 222a may not overlap the vertical portion 212 of the inner case 210 in the top plan view. More specifically, the distal end of the protrusion portion 222a may not overlap the distal end of the lower portion of the vertical portion 212 in the top plan view. The distal ends of the protrusion portion 222a and the vertical portion 212 are spaced from each other along the first and/or second direction (e.g., horizontal in FIG. 5).

Although not shown in the drawings, the intake opening 231 may have a closed curve planar shape in the top plan view, defined by an outer surface of the vertical portion 212 and an inner surface of the protrusion portion 222a at the distal end thereof. More specifically, according to one or more exemplary embodiment of the present disclosure, the intake opening 231 may have a closed ring shape surrounding the discharge opening 214 in the top plan view.

The intake opening 231 may have a width Wi taken in the first and/or second direction (e.g., horizontal in FIG. 5) of about 20 mm or less. In this case, when the intake opening 231 has a width larger than 20 mm, the flow speed of particles and air is relatively low, and thus particles may leak to the outside of the particle removal device and/or the processed target substrate S.

The stage 400 may be spaced apart from the protrusion portion 222a of the lower plate 222 by an interval Ws smaller than the width Wd of the discharge opening 214 defined at the vertical portion 212 of the inner case 210.

In another exemplary embodiment according to the invention, a laser cutting apparatus includes a stage on which a target substrate is disposed for cutting, a particle removal device disposed to be spaced apart from the stage, and a laser radiation unit (not shown) configured to radiate laser light through an internal space defined in the particle removal device. The laser radiation unit may be disposed connected to the internal space defined in the particle removal device such that a laser light generated and/or provided by the laser radiation unit may travel within the internal space to the target substrate such as to separate portions of the target substrate from each other. The stage described in one or more exemplary embodiment of a particle removal device may form a component of the laser cutting apparatus.

The laser radiation unit may be spaced apart from the particle removal device such as being disposed generally outside thereof, without being limited thereto. In an exemplary embodiment, a connection portion between the laser radiation unit and the particle removal device may provide the laser light from the laser radiation unit to the internal space of the particle removal device.

In another exemplary embodiment, the laser radiation unit or portions thereof may be disposed inside the particle removal device without interference with other components of the particle removal device, such that the laser light generated and/or provided by the laser radiation unit may travel within the internal space of the particle removal device to the target substrate such as to separate portions of the target substrate from each other.

According to one or more exemplary embodiment of the present disclosure, particles or contaminants generated during processing such as by laser cutting of the target substrate S may be effectively removed without leakage to the outside of the particle removal device and/or the processed target substrate S. Accordingly, contamination with particles from processing a target substrate S, of a display panel formed from a separated portion of the processed target substrate S and the internal parts of manufacturing equipment at and/or disposed relative to the particle removal device may be reduced or effectively prevented.

One or more embodiment of the particle removal device and the laser cutting apparatus including the same according to the present disclosure may reduce or effectively prevent a display device formed from a separated portion of a processed target substrate and the internal parts of display device manufacturing equipment at and/or disposed relative to the particle removal device from being contaminated by effectively removing particles generated during the manufacture of a display device (e.g., the processing of the target substrate).

It will be apparent to those having common knowledge in the art to which the present disclosure pertains that the above-described invention is not limited to the above-described exemplary embodiments and the accompanying drawings and various replacements, variations and alterations may be made without departing from the technical spirit of the present disclosure.

What is claimed is:

1. A particle removal device comprising:
   a stage;
   an inner case disposed on the stage, the inner case comprising:
      a vertical portion and an inclined portion which extends from the vertical portion,
      an internal space to which the stage is exposed and through which a laser light from a laser irradiator travels to a target substrate on the stage, and
      a first discharge opening which is in fluid connection with the internal space and at a distal end of the inner case;
   an outer case connected to the inclined portion of the inner case, the outer case comprising:
      a side wall portion disposed to surround an outer surface of the inner case,
      a protrusion portion protruded from the side wall portion toward the first discharge opening of the inner case, and
   a second discharge opening defined in the side wall portion, in fluid connection with the first discharge opening of the inner case; a suction pump connected to the second discharge opening, with which a suction force is provided to the second discharge opening;
      an air injector on the outer case and in fluid connection with the internal space of the inner case, with which air is injected to the internal space of the inner case;
      an intake opening in fluid connection with both the first and second discharge openings, the intake opening defined between the distal end of the inner case and a distal end of the protrusion portion of the outer case which is closest to the stage; and
      an air flow path defined in order from the internal space toward the stage, through the first discharge opening of the inner case, along the stage to the intake opening, through the intake opening and through the second discharge opening of the outer case,
      wherein a width of the intake opening as a distance between the distal end of the inner case and the distal end of the protrusion portion is smaller than a width of the first discharge opening.

2. The particle removal device of claim 1, wherein along a thickness direction of the particle removal device, the protrusion portion of the outer case is spaced apart from the stage by a distance of about 20 millimeters or less.

3. The particle removal device of claim 1, wherein the inner case surrounded by the side wall portion of the outer case comprises:
the vertical portion comprising a lower end thereof disposed closest to the stage, the lower end of the vertical portion defining the distal end of the inner case at which the first discharge opening is defined; and
the inclined portion extended from an upper end of the vertical portion which is opposite to the lower end thereof, inclined at a predetermined angle with respect to the vertical portion.

4. The particle removal device of claim 3, wherein a distance between the inclined portion of the inner case and the side wall portion of the outer case is larger than the width of the intake opening.

5. The particle removal device of claim 3, wherein the intake opening is defined between the distal end of the protrusion portion of the outer case and the lower end of the vertical portion which is closest to the stage.

6. The particle removal device of claim 3, wherein the width of the intake opening as a distance between the distal end of the inner case defined by the lower end of the vertical portion and the distal end of the protrusion portion is about 20 millimeters or less.

7. The particle removal device of claim 3, wherein in a direction along a thickness of the particle removal device, the distal end of the protrusion portion overlaps the lower end of the vertical portion which is closest to the stage.

8. The particle removal device of claim 3, wherein in a direction along a thickness of the particle removal device, the distal end of the protrusion portion of the outer case overlaps the vertical portion of the inner case.

9. The particle removal device of claim 3, wherein in a direction along a thickness of the particle removal device, the protrusion portion of the outer case overlaps the inclined portion of the inner case but does not overlap the vertical portion of the inner case.

10. The particle removal device of claim 3, wherein in a direction along a thickness of the particle removal device, the distal end of the protrusion portion of the outer case does not overlap the vertical portion of the inner case.

11. The particle removal device of claim 3, wherein in a top plan view, the intake opening has a closed curve shape.

12. The particle removal device of claim 1, wherein the air injector comprises a nozzle through which air is output from the air injector to the internal space of the inner case.

13. The particle removal device of claim 12, wherein an air injection angle of the nozzle through which the air is output to the internal space of the inner case is adjustable.

14. A laser cutting apparatus comprising:
a stage on which a target substrate is disposed; and
a particle removal device disposed apart from the stage, defining an internal space of the particle removal device to which the stage is exposed and through which a laser light from a laser irradiator travels to the target substrate disposed on the stage;
wherein the particle removal device defining the internal space to which the stage is exposed comprises:
an inner case disposed on the stage, the inner case comprises:
a vertical portion and an inclined portion which extends from the vertical portion,
the internal space, and
a first discharge opening which is in fluid connection with the internal space and at a distal end of the inner case;
an outer case comprising:
a side wall portion disposed to surround an outer surface of the inner case,
a protrusion portion protruded from the side wall portion toward the first discharge opening of the inner case, and
a second discharge opening defined in the side wall portion, in fluid connection with the first discharge opening of the inner case;
a suction pump connected to the second discharge opening, with which a suction force is provided to the second discharge opening;
an air injector on the outer case and in fluid connection with the internal space of the inner case, with which air is injected to the internal space of the inner case;
an intake opening in fluid connection with both the first and second discharge openings, the intake opening defined between the distal end of the inner case and a distal end of the protrusion portion of the outer case which is closest to the stage; and
an air flow path defined in order from the internal space toward the stage, through the first discharge opening of the inner case, along the stage to the intake opening, through the intake opening and through the second discharge opening of the outer case,
wherein a width of the intake opening as a distance between the distal end of the inner case and the distal end of the protrusion portion is smaller than a width of the first discharge opening.

15. The laser cutting apparatus of claim 14, wherein along a thickness direction of the particle removal device, the protrusion portion of the outer case is spaced apart from the stage by a distance of about 20 millimeters or less.

16. The laser cutting apparatus of claim 14, wherein the inner case surrounded by the side wall portion of the outer case comprises:
the vertical portion comprising a lower end thereof disposed closest to the stage, the lower end of the vertical portion defining the distal end of the inner case at which the first discharge opening is defined; and
the inclined portion extended from an upper end of the vertical portion which is opposite to the lower end thereof, inclined at a predetermined angle with respect to the vertical portion.

17. The laser cutting apparatus of claim 16, wherein a distance between the inclined portion of the inner case and the side wall portion of the outer case is larger than the width of the intake opening.

18. The laser cutting apparatus of claim 16, wherein the width of the intake opening is defined as a distance between the distal end of the protrusion portion of the outer case and the lower end of the vertical portion which is closest to the stage.

19. The laser cutting apparatus of claim 18, wherein the width of the intake opening is about 20 millimeters or less.

20. The laser cutting apparatus of claim 14, wherein in a top plan view, the intake opening has a closed curve shape.

* * * * *